March 9, 1954

A. A. CHERAMIE 2,671,519

AMPHIBIOUS TRACTOR

Filed Jan. 17, 1949

Andrew A. Cheramie
INVENTOR.

BY

March 9, 1954  A. A. CHERAMIE  2,671,519
AMPHIBIOUS TRACTOR

Filed Jan. 17, 1949  5 Sheets-Sheet 4

Andrew A. Cheramie
INVENTOR.

BY *Clarence A. O'Brien*
*and Harvey B. Jacobson*
Attorneys

March 9, 1954 A. A. CHERAMIE 2,671,519
AMPHIBIOUS TRACTOR

Filed Jan. 17, 1949 5 Sheets-Sheet 5

Andrew A. Cheramie
INVENTOR.

BY
Attorneys

Patented Mar. 9, 1954

2,671,519

UNITED STATES PATENT OFFICE 2,671,519

AMPHIBIOUS TRACTOR

Andrew A. Cheramie, Cut Off, La.

Application January 17, 1949, Serial No. 71,292

4 Claims. (Cl. 180—6.48)

My invention relates to improvements in amphibious tractors for use on land or water and especially on marsh land.

The primary object of my invention is to provide an amphibious tractor with pontoon wheels for traction purposes on either dry or marshy land, or propelling purposes in water, and powered by two engines with driving mechanism of simple form and compact arrangement for driving the wheels simultaneously by either or both engines for either purpose and in pairs selectively by either engine differentially for steering purposes to increase the efficiency of the tractor while being turned.

Another object is to provide in a tractor of the type above set forth for driving the wheels simultaneously by either or both engines to increase, or decrease the driving torque applied to the wheels according to operating requirements on different kinds of land, or in the water, and when the tractor is operating under different loads.

Another object is to provide a tractor which is equipped to attain the above objects and also to carry a large crew and a heavy load so as to obviate splashing of the same in travel on marsh land or in water.

Still another object is to provide in such a tractor winches arranged to be driven by the drive mechanism while the tractor is standing or traveling, and either separately or simultaneously at will.

Still another object is to provide spring suspensions for the pontoon wheels adapted for heavy duty and to permit play of the wheels to compensate for irregularities in the ground, without losing traction.

Still another object is to provide in such a tractor for strength, durability and balance either on land or water, and for economy in manufacture and use.

Other and subordinate objects, within the purview of my invention, together with the precise nature of my improvements will be readily understood when the succeeding description and claims are read with reference to the drawings accompanying and forming part of the specification.

In said drawings:

Figure 6 is a view in vertical section taken on the irregular line 6—6 of Figure 2 and drawn to a larger scale.

Figure 1:
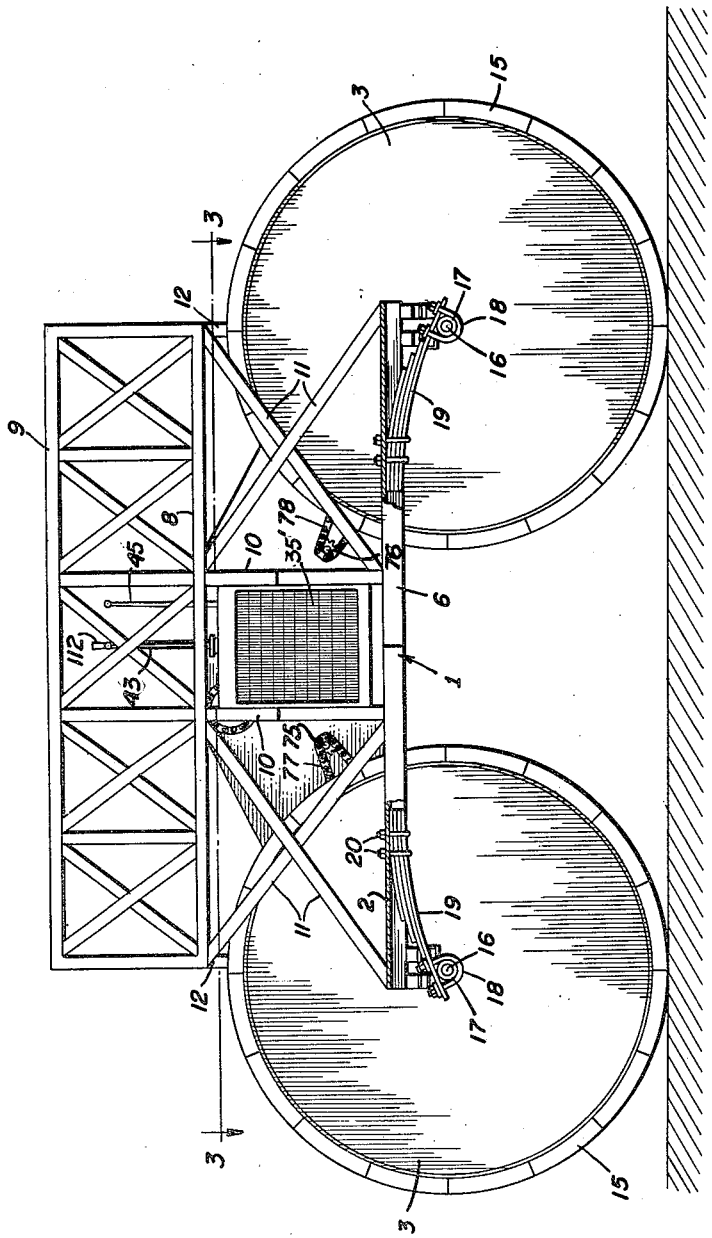
Figure 1 is a view in side elevation, partly in section, of my improved tractor in the preferred embodiment thereof.

Referring to the drawings by numerals, my improved amphibious tractor, as illustrated, comprises a chassis frame, designated as a unit by the numeral 1, and including a pair of parallel side frame bars 2 of channel form cross-connected intermediate pontoon wheels of pairs 3, 4 arranged in pairs at opposite sides of the chassis frame 1 in diametrically spaced relation in each pair. The cross connections take the form of a pair of laterally spaced transverse frame bars 5 suitably secured to the side frame bars 2. Horizontal strut frames 6 on the outer sides of the side frame bars 2 brace the same.

A rectangular chassis center frame 7 extends endwise longitudinally of the chassis frame 1 between the pairs of pontoon wheels 3, 4 and is suitably supported between its ends and upon opposite sides of its transverse center by the transverse frame bars 5 to which it is connected in any suitable manner. The purpose and advantage of the chassis center frame 7 will presently appear.

A platform 8 for a load, and a crew, surmounts the chassis frame 1 above the pontoon wheels 3, 4 and is suitably spaced above said wheels to prevent interference therewith under vertical play of said wheels 3, 4 relative to the chassis frame 1. The platform 8 is surrounded by an upstanding, skeleton, hand rail frame 9, the purpose of which will be obvious, and is substantially as wide as the chassis frame 1 and as long as the distance from center to center of the pontoon wheels 3, 4 of the pairs, whereby to afford freedom of action of a large crew on the platform, and ample space for a load carried on said platform.

The platform 8 is supported in centered relation to the chassis frame 1, to obviate overbalancing said frame, by pairs of side uprights 10 upstanding from the side frame bars 2 at the ends of the transverse frame bars 5, and is also supported by diagonal cross braces 11 at opposite sides of the pairs of uprights 10 and rising from the side frame bars 2. Corner uprights 12 at the ends of the chassis center frame 7, connected in pairs by diagonal crossed braces 13, support the platform 8 between the pairs of pontoon wheels 3, 4.

The pontoon wheels 3, 4 are of hollow cylindrical form with broad treads provided with two circumferentially spaced series of tread cross cleats 15 staggered in each series relative to those in the other series with inner ends in the series overlapping and the cleats spaced sufficiently close together to provide for contact of a cleat with the ground at all times.

The cleats 15 are of blade-like form adapting the same to propel in the water and are sufficiently deep to protect the periphery of said wheels 3, 4 against damage from small stones, or irregularities in the ground, and to space the peripheries of said wheels 3, 4 from the ground so as to obviate splashing the water upon the platform 8 when said wheels are operating over wet, hard, or marshy ground.

The pontoon wheels 3, 4 are mounted between the ends of the frame side bars 2 and the ends of the chassis center frame 7 as follows.

Live wheel spindles 16 extend through said wheels 3, 4 and are suitably fixed thereto. Outer ends of the wheel spindles 16 are journaled in sleeve bearings 17 secured by U-bolts 18 to the floating ends of cantilever springs 19 beneath the ends of the frame side bars 2, and extending longitudinally thereof with the other ends of said springs bolted, as at 20, in the channels of said bars 2.

Figure 2:
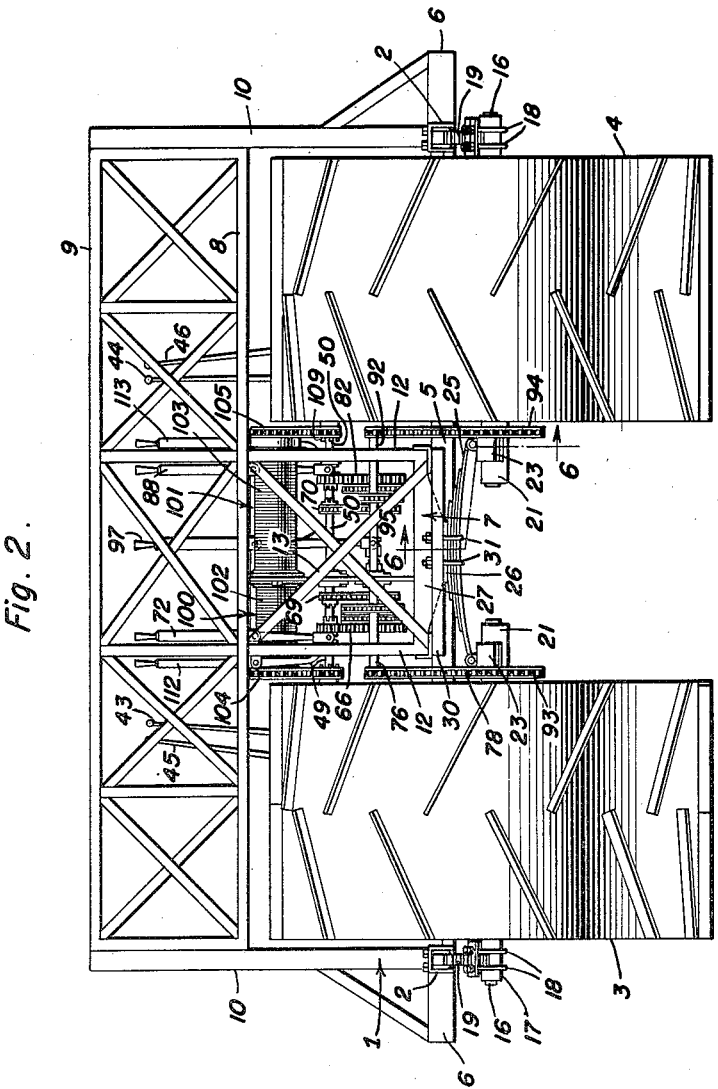
Figure 2 is a view in end elevation.

The spindles 16 of the pontoon wheels 3, 4 which are axially opposite at the ends of the chassis frame 1 are connected together in pairs by spring suspensions supporting the ends of the chassis frame 7, all as shown in Figures 2 and 6 in connection with one of the pairs of spindles 16 and one end of said frame 7, and as follows.

The inner ends of the connected pairs of spindles 16 are journaled in sleeve bearings 21. Each sleeve bearing 21, as shown in Figure 6, is interposed between and suitably fixed to a pair of cushion blocks 22, of rubber, or the like, confined in a cage 23 to which a suitably fixed crown plate 24 is secured. The crown plates 24 are connected together, in a pair, by a pair of side by side, pivoted, semi-elliptic springs 25 transverse to the adjacent end of the chassis center frame 7 and beneath the same.

A central saddle plate 26 on said pair of springs 25 supports the adjacent end 27 of the chassis center frame 7, and hence the chassis frame 1, in its longitudinal center and between the pair of adjacent pontoon wheels 3, 4, said saddle plate 26 being slidably connected to said end 27 so that the described spring suspension may be slidably adjusted longitudinally of the chassis center frame 7 for a purpose presently explained. The slidable connection may comprise bolts, as at 28, in said end 27 and a slot 29 in said plate 26. A pair of stop bars 30 extend across the saddle plate 26 upon opposite sides of the said end 27 of said frame 7 to limit sliding of the spring suspension. U-bolts 31 secure said springs 25 and the stop bars 30 to the saddle plate 26.

The drive mechanism for the pontoon wheels 3, 4 will now be described. A pair of motors in the form of internal combustion engines 35, 36 are mounted in line at opposite sides of the chassis center frame 7, between the pontoon wheels 3, 4 of the pairs, respectively, in the transverse center of the chassis frame 1 and by any suitable means, for instance, supports 37, 38 on the transverse frame bars 5. The numerals 35', 36' designate the usual radiators for the engines 35, 36.

The engines 35, 36 are of the conventional type, with variable speed transmissions 39, 40, preferably of the four forward speeds and a reverse type, and with clutches 41, 42. The speed change levers 43, 44 and the clutch control levers 45, 46 for the engines 35, 36 are arranged in any suitable manner for operation from the platform 8.

The power transmission shafts 47, 48 of the engines 35, 36 are aligned transversely of the chassis frame 1 with a pair of coaxial secondary power transmission shafts 49, 50 each associated with a corresponding one of the power transmission shafts 47, 48 and forming part of a secondary transmission for driving in opposite directions whereby the engine 35 may be operatively connected to the pair of pontoon wheels 3 and the engine 36 to the pair of pontoon wheels 4 to separately or simultaneously drive said pairs all in a manner presently described.

The major parts of the secondary driving transmission are carried in a cage 51 on the chassis center frame 7, between the engines 35, 36, said cage 51 comprising a pair of upright side plates 52, 53 and a similar plate 54 intermediate the plates 52, 53.

The before-mentioned pair of secondary power transmission shafts 49, 50 are journaled in suitable bearings 55, 56, 57, 58 on said plates 52, 54, 53. Universal joints 59, 60 operatively connect the power transmission shafts 47, 48 to the secondary power transmission shafts 49, 50 for separate drive of the same by the engines 35, 36.

A pair of coaxial reversible driving shafts 61, 62 extend beneath said shafts 49, 50, respectively, parallel therewith and each associated with a corresponding one of the secondary power transmission shafts 49, 50, and with a corresponding pair of wheels 3, 4. The reversible driving shaft 61 is journaled in bearings 63, 64 on the side plate 52 and the intermediate plate 54.

A pair of reduction gears 65, 66 on the secondary power transmission shaft 49 and the reversible driving shaft 61 operatively connect said shaft 49 to said shaft 61 to drive the latter in one direction. The gear 65 is splined on said shaft 49, as shown, and laterally shiftable thereon to disengage the gear 66 and engage a clutch collar 67 on said gear 65 with a clutch collar 68 on a sprocket wheel 69 loose on said shaft 49 and forming part of a sprocket and chain reduction drive 70 to the reversible driving shaft 61 for driving said shaft 61 in the opposite direction when the clutch collars 67, 68 are engaged. A clutch shift collar 71 on the gear 65 and a shift lever 72 provide for shifting said gear 65 from meshing engagement with the gear 66 into either a neutral position or into a position in which the clutch collar 67 is engaged with the clutch collar 68. As will be understood, when the gear 65 is shifted into neutral position, the drive between said shafts 49 and 61 is disabled.

A pair of sprocket and chain reduction drives 73, 74 extend oppositely from the reversible driving shaft 61 to a pair of power delivery shafts 75, 76 suitably journaled in the plates 52, 54 at opposite sides of said shaft 61 and are operatively connected between the chassis center frame 7 and the pairs of pontoon wheels 3, to the inner end of the spindles 16 of said wheels 3, by sprocket and chain drives 77, 78.

The reversible driving shaft 62 is journaled in a bearing 79 on the plate 53 and in a socket bearing 80 fast on reversible driving shaft 61.

The secondary power transmission shaft 50 is operatively connected to the reversible driving shaft 62 by a pair of reduction gears 81, 82 to drive said shaft 62 in one direction, and is also connected to said shaft 62 by a sprocket and chain reduction drive 83 all in the same manner as described with reference to the secondary power transmitting shaft 49 and the reversible driving shaft 61. The gear 81, in this instance also, is splined on the secondary power transmitting shaft 50, as illustrated, for sliding on said shaft to disengage the gear 82 and engage a clutch collar 84 thereon with a clutch collar 85 on a sprocket wheel 86 freely rotatable on said shaft 50 and forming part of the sprocket and chain drive 83 between said shafts 50, 62 and corresponding to the sprocket and chain drive 70. A clutch-shifting collar 87 on the gear 81 and a shift lever 88 provide for shifting the gear 81 and the clutch collar 84 in the same manner and for the same purpose as described with reference to the gear 65 and clutch collar 67. A pair of sprocket and chain reduction drives 89, 90 extend oppositely from the reversible driving shaft 62 to a pair of power delivery shafts 91, 92 suitably journaled in the plates 53, 54, in alignment respectively, with the beforementioned power delivery shafts 75, 76. Sprocket and chain drives 93, 94, like the drives 77, 78, connect the power delivery shafts 91, 92 to the spindles 16 of the pair of pontoon wheels 4.

Figure 5:
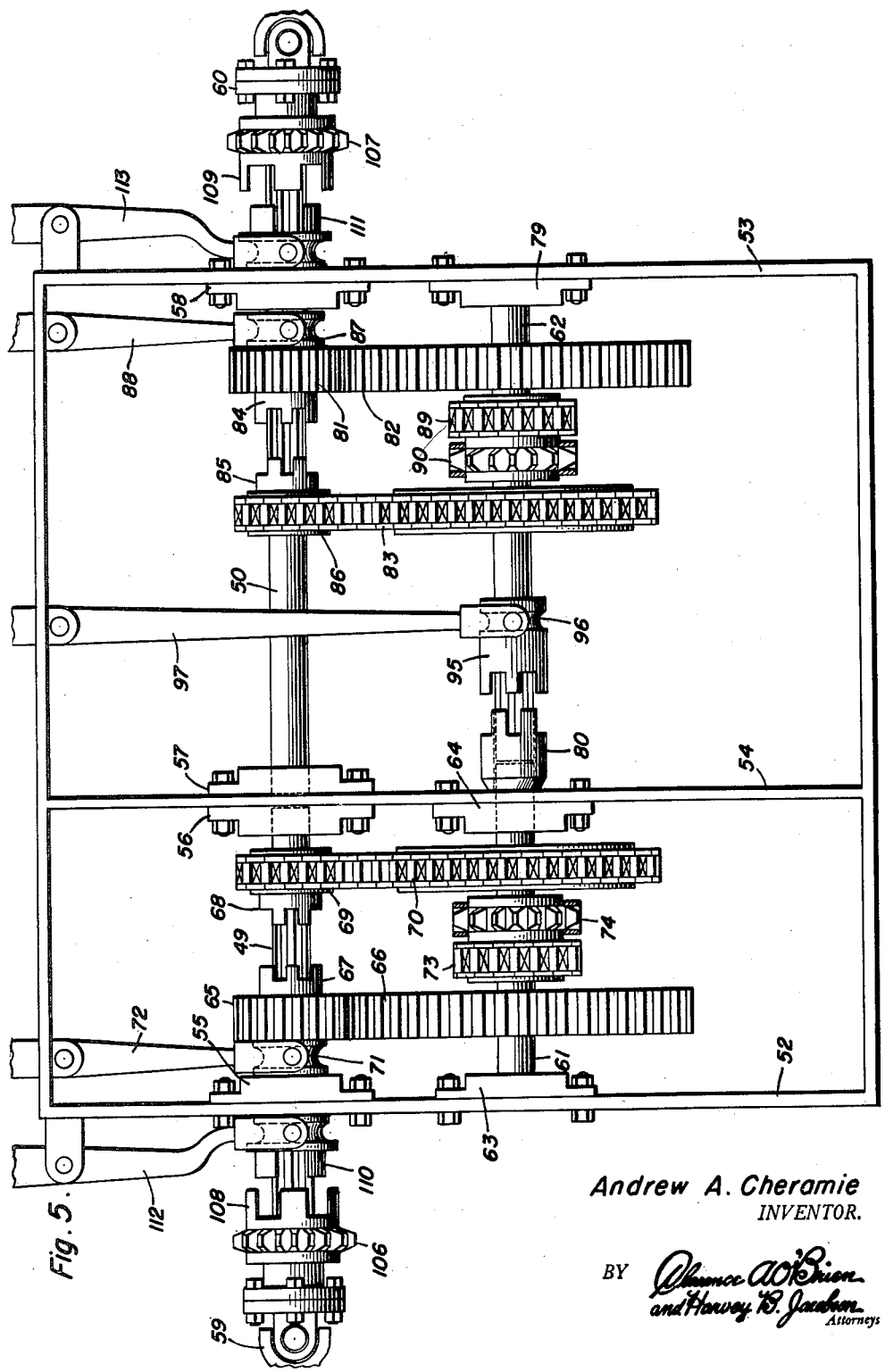
Figure 5 is a view in end elevation, with parts in section, of the secondary oppositely driving transmission drawn to a larger scale and viewed from the same end of the tractor as in Figure 2.

The secondary driving transmission in so far as the same has been described, in the foregoing, provides for driving the pairs of pontoon wheels 3, 4 separately. However, means is provided in this transmission whereby the pairs of pontoon wheels 3, 4 may be driven by said transmission simultaneously by either or both engines 35, 36. This means comprises a clutch sleeve 95 splined on the reversible driving shaft 62, as best shown in Figure 5, for shifting into clutching engagement with the before-mentioned socket bearing 80 which is formed as a clutch member. A clutch shifting collar 96 on the clutch sleeve 95 and a shift lever 97 provide for shifting said clutch sleeve 95. As will be understood, the shift levers 72, 88, 97 are suitably extended up through the platform 8 for operation from said platform.

Referring now to the operation of the invention so far described, with the clutch sleeve 95 engaged with the clutch forming socket bearing 80, both pairs of pontoon wheels 3, 4 may be driven by either engine 35, 36, selectively, or by both engines synchronized by the usual throttle and in one direction through either pair 65, 66 or 81, 82 of reduction gears, or, in the opposite direction through either reduction sprocket and chain drives 70, 83, it being merely necessary to shift the gear 65 out of engagement with the gear 66 and into engagement with the clutch collar 68, or vice versa, or to correspondingly shift the gear 81 in driving in said opposite direction. With any speed of the engines 35, 36 as determined by the gear shift and the transmissions 39, 40 thereof, the tractor is driven at a lower speed by the secondary driving transmission and the usual reverse of the engines 35, 36 may be eliminated in reversing the tractor except when a much lower reverse speed is required than is afforded by the secondary forward and reverse driving transmission.

To steer or turn the tractor, either pair of pontoon wheels 3, 4 may be driven at a faster rate speed than the other by speed change in the transmissions 39, 40 of the engines 35, 36, or by throttling one engine down to a lower speed. For separate drive of the pairs of pontoon wheels 3, 4, the clutch sleeve 95 is disengaged from the clutch forming socket bearing 80 and the pairs of pontoon wheels 3, 4 are driven through the pairs of speed reduction gears 65, 66 on the one hand and 81, 82, on the other hand, or, through the sprocket and chain drives 70 on the one hand, and 83 on the other hand, depending upon the direction of drive to be imparted by the secondary driving transmission.

A pair of winches 100, 101 are suitably mounted between the plate 54 and the plates 52, 53 underneath the platform 8 parallel with the secondary power transmitting shafts 49, 50 and upon opposite sides of the line of said shafts in a position for extension of cables 102, 103 thereon from opposite ends of the tractor. Sprocket and chain drives 104, 105 extend from said shafts 49, 50 to said winches 100, 101, respectively, including sprocket wheels 106, 107 freely rotatable on said shafts 49, 50, respectively, and provided with fixed clutch collars 108, 109 thereon. Sliding clutch sleeves 110, 111 splined on said shafts 49, 50, respectively, are engageable with said clutch collars 108, 109 by means of shift levers 112, 113 which extend in any suitable manner up through the platform 8 to be operated from said platform.

With reference to the operation of the winches 100, 101, the winch 100 may, when the clutch sleeve 110 is engaged with the clutch collar 108, be operated in opposite directions, respectively, by the engine 35 under control of the transmission 39, and reverse speed control of said engine, and independently of drive of the tractor by merely shifting the gear 65 out of mesh with the gear 66 and into its neutral position. Also, said winch 100 may be operated, while the tractor is being driven, through the medium of the secondary power transmission shaft 49 and in one direction only regardless in which direction the tractor is being driven. The winch 101 may, when the clutch sleeve 111 is engaged with the clutch collar 109, be similarly operated by the engine 36 by merely shifting the gear 81 out of mesh with the gear 82 and into a neutral position. Obviously, the winches 100, 101 may be simultaneously operated either in opposite or the same direction with both engines 35, 36 running and the clutch sleeves 110, 111 engaged with the clutch collars 108, 109 and the gears 65, 86 shifted to neutral position.

Figure 3:
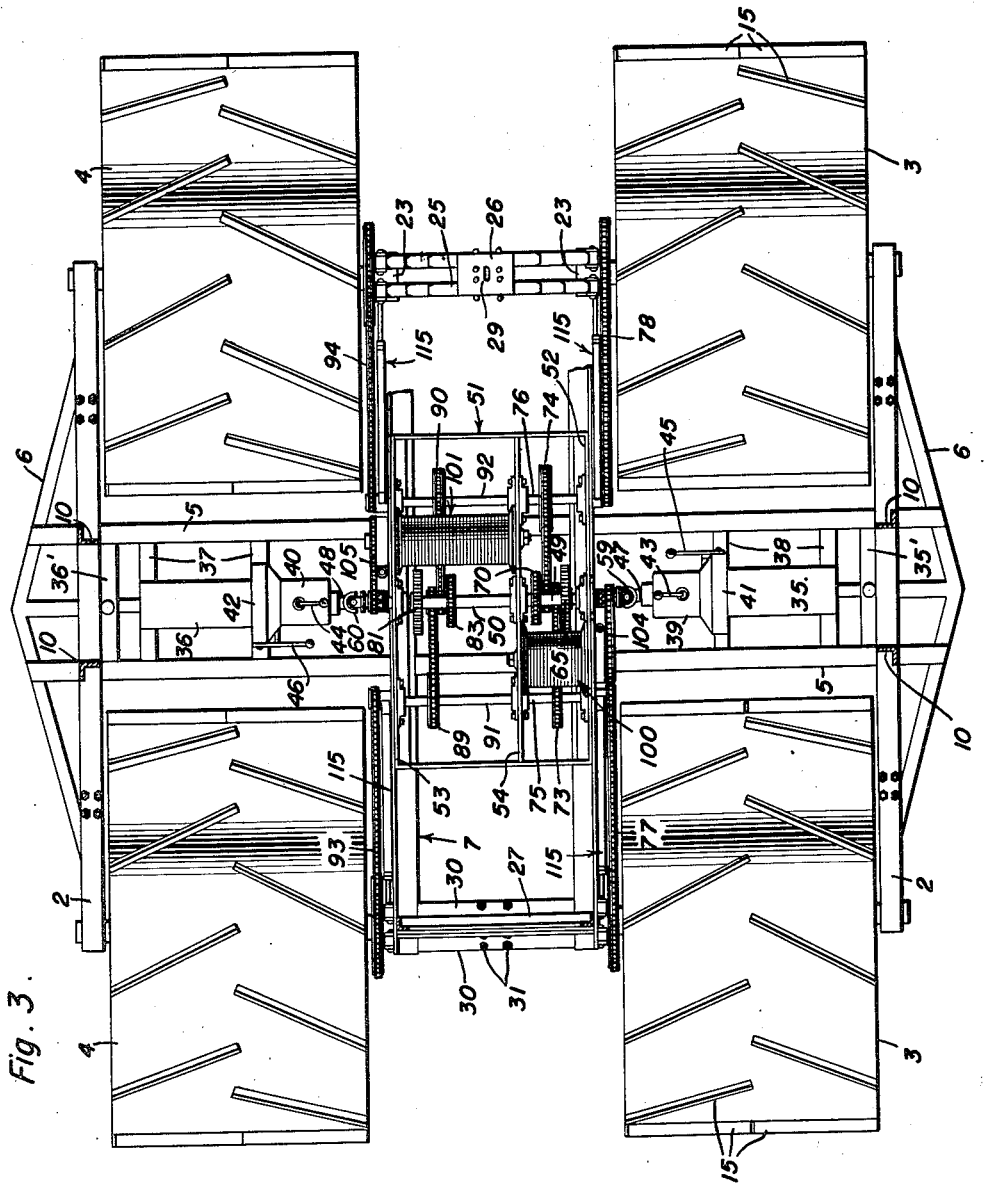
Figure 3 is a view in horizontal section taken on the line 3—3 of Figure 1 with the chassis center frame broken away.
Figure 4:
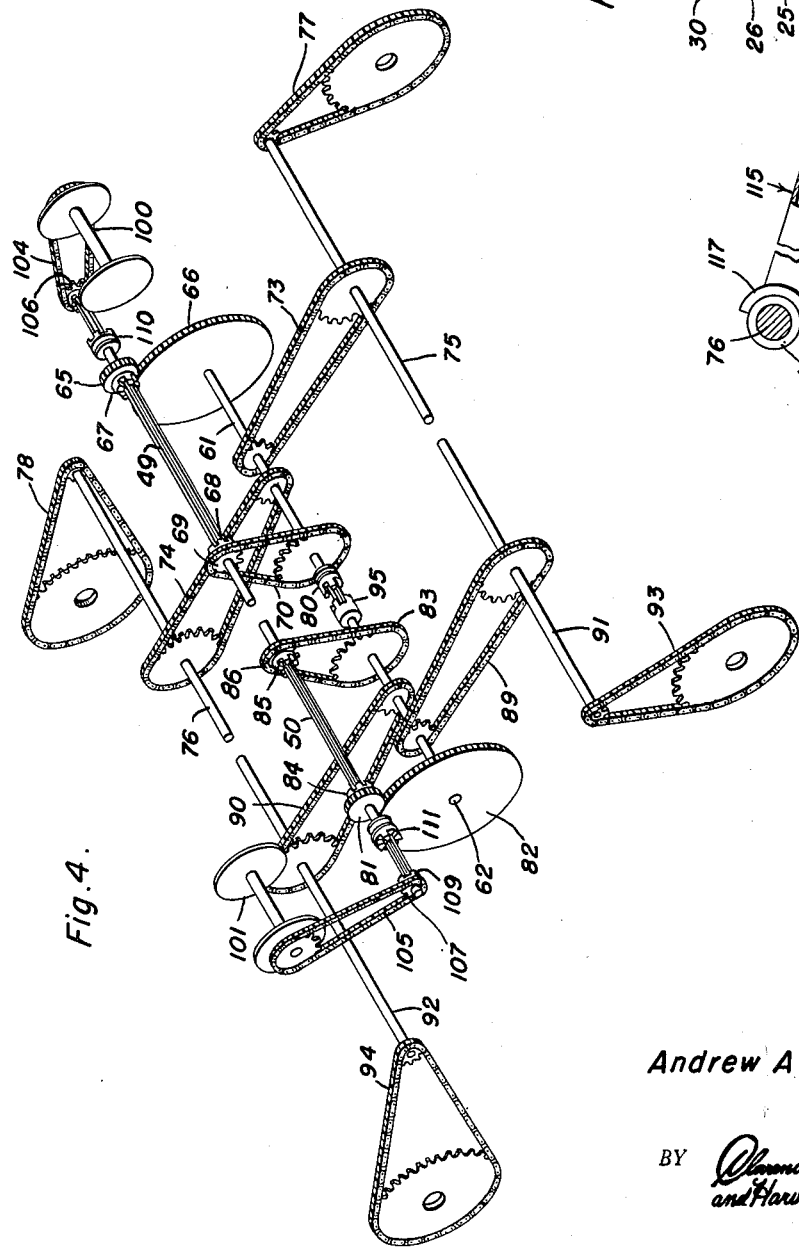
Figure 4 is a view in perspective of the drive mechanism detached, with the engines omitted, and viewed from the opposite end of the tractor than in Figure 2.

Reverting now to the previously described spring suspensions (see Figure 6) for connecting the spindles 16 of the pontoon wheels 3, 4 together in pairs at the ends of the tractor, as previously set forth the bolt and slot connections 28, 29 between the saddle plates 26 and the ends 27 of the chassis center frame 7 provide for limited adjustment of the spring suspensions along said frame between the stop bars 30. This adjustment is for tightening the sprocket and chain drives 77, 78, 93, 94 and is effected by the following means. Extensible adjusting devices 115, one of which is shown in detail in Figure 6, are provided between the power delivery shafts 75, 91, 76, 92 and the bearings 21 of the spindles 16. These devices 115, as shown in Figure 3, are disposed between the chassis center frame 7 and the pontoon wheels 3, 4. Each device 115 comprises a tube 116 with an arcuate end saddle 117 fitting against a bushing 117' on the shafts 75, 91, 76, 92, as the case may be, but, as shown, against shaft 76. A rod 118 extends out of the other end of the tube 116 through the adjacent cage 23 and is equipped with an end plate 120 interposed between the cage 23 and one of the cushion blocks 22. A nut 121 threaded on the rod 118 and fitting in the tube 116 guides said rod in said tube for sliding movement to extend or retract said rod relative to said tube. A larger nut 122 threaded on to the rod 118 for turning against one end of the tube 116 provides for extending the rod 118 and a jamb nut 123 on said rod 118 provides for locking the nut 122. By extending the rods 118, in the manner described, the devices 115 may be extended and caused to exert a thrust against the shafts 75, 91, 76, 92 and against the cushion blocks 22 engaged by the plates 120 to thereby yieldingly adjust the spring suspensions connecting the ends of the spindles 16 to adjust said ends laterally and thereby tighten the sprocket and chain drives 77, 78, 93, 94. It will be noted that such adjustment of the spring tensions connecting the ends of the spindles 16, in pairs, will not interfere with freedom of vertical play of the spindles and the pontoon wheels 3, 4. By virtue of the cushion blocks 22, the spindles 16 and the wheels 3, 4 are permitted a limited degree of lateral twisting movement compensated for by the cantilever springs 19. By providing for play of the wheels 3, 4 in the manner indicated, said wheels may have compensating movement on rough ground, or the like, to obviate vibration and prolong the life of the wheels and tractor under rough usage.

It is to be noted that my invention provides a tractor with both ends exactly alike and which is adapted to be operated with equal facility in opposite directions with either end foremost. This obviates the necessity for turning the machine around and backing the same, which is essential in various operations with a front and rear end tractor. Also, with the two ends alike and the drive mechanism described, the tractor may be quickly halted and then driven forwardly in relatively opposite directions selectively.

Other particular advantages are that the operator may maintain in action one engine for operating the tractor in a selected direction while allowing the other engine to slow down or idle or be reversed so as to cause the tractor to swerve from a straight line or turn to right or left in either a long or short curve or to turn completely around within a small space. The tractor may be maintained in motion with one engine while the driving mechanism is being conditioned for higher or lower or reverse drive of the tractor by the other engine, and under drive by both engines if either fails the other will maintain the drive to prevent the tractor from stalling which is of vital importance in operating on soggy or marshy land in preventing the tractor from digging in when started after a stall.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a tractor having a chassis frame, traction wheels for said frame arranged in pairs upon opposite sides of the frame in diametrically opposite relation in each pair, a pair of engines mounted in line on said frame upon opposite sides thereof and each including a variable speed transmission having a power transmission shaft, a secondary driving transmission mounted on said frame including a pair of secondary power transmission shafts coaxially aligned with the power transmission shafts first mentioned and each of said secondary power transmission shafts connected to a corresponding one of the first mentioned power transmission shafts for operation by the engines of said pair of engines independently, operating connections between each secondary power transmission shaft and a pair of the traction wheels whereby each engine is operatively connected to a related pair of the traction wheels and including a pair of coaxially aligned reversible driving shafts, and clutch controlled reversing drives between each secondary power transmission shaft and a corresponding one of said reversible driving shafts whereby each engine may drive its related pair of traction wheels in relatively reverse directions independently of the other pair, and clutch means on the reversible driving shafts for coupling the pair of reversible driving shafts together at will for simultaneous drive thereof from either or both said secondary power transmission shafts through either or both of said clutch controlled drives whereby either or both engines may drive said pairs of traction wheels simultaneously.

2. In a tractor having a chassis frame and traction wheels arranged in pairs at opposite sides and ends of the frame, a pair of twin engines mounted in line on said frame at opposite sides thereof and having a pair of coaxially aligned power transmission shafts, and a drive between said transmission shafts and wheels for driving the pairs of wheels simultaneously or independently by both engines, or by either engine selectively, or reversely relatively by both engines comprising a pair of separate coaxial secondary transmission shafts mounted on said frame between and in coaxial alignment with the first named shafts, each of the first named shafts being drivingly associated with a corresponding one of said secondary shafts, clutch means associated with each engine for selectively driving each of the secondary shafts by its associated one of the first-named shafts for driving said secondary shafts separately or simultaneously with each other, a pair of separate reversible shafts coaxially aligned on said frame and parallel with said secondary shafts and each associated with a corresponding one of said secondary shafts to be driven thereby and also drivingly associated with a corresponding pair of said wheels, reversible drives from each secondary shaft to its associated reversible shaft for reversely driving each reversible shaft by its associated secondary shaft, operating connections from each reversible shaft to the corresponding pair of wheels with which it is drivingly associated, and other clutch means on said reversible shafts for connecting and disconnecting said reversible shafts selectively for operation singly or simultaneously to drive the pairs of wheels with which said reversible shafts are drivingly associated independently or simultaneously with respect to each other.

3. The combination of claim 2, said reversible driving connections comprising, respectively, a gear drive and a sprocket and chain drive from each secondary shaft to its associated reversible shaft, and clutch means on said last named drives and secondary shafts for clutching either one of the last named drives to the corresponding secondary shaft and disconnecting the others.

4. The combination of claim 2 said operating connections including a pair of motion transmitting shafts on said frame for each pair of wheels drivingly connected thereto, each pair of shafts being associated with a corresponding one of the reversible shafts for drive thereby, and sprocket and chain means operatively connecting each pair of motion transmitting shafts with the corresponding reversible shaft.

ANDREW A. CHERAMIE.

References Cited in the file of this patent

UNITED STATES PATENTS

| Number | Name | Date |
|---|---|---|
| 851,540 | Martin | Apr. 23, 1907 |
| 1,138,148 | Ramsey | Mar. 4, 1915 |
| 1,245,680 | Chase | Nov. 6, 1917 |
| 1,288,679 | Reichenbach | Dec. 24, 1918 |
| 1,309,684 | Hamrick | July 15, 1919 |
| 1,358,997 | Springer | Nov. 16, 1920 |
| 1,371,330 | Springer | Mar. 15, 1921 |
| 1,430,251 | Parker | Sept. 26, 1922 |
| 1,490,056 | Wostenberg | Apr. 8, 1924 |
| 1,503,454 | Ford | July 29, 1924 |
| 1,761,828 | Haubert | June 3, 1930 |
| 1,763,767 | Fageol | June 17, 1930 |
| 2,126,255 | Hacker | Aug. 9, 1938 |
| 2,155,434 | Marsh | Apr. 25, 1939 |
| 2,309,875 | Thompson | Feb. 2, 1943 |